United States Patent

Cath et al.

[15] 3,654,560

[45] Apr. 4, 1972

[54] DRIFT COMPENSATED CIRCUIT

[72] Inventors: Pieter G. Cath, Cleveland, Ohio; Maurice S. Klapfish, Cambridge, Mass.

[73] Assignee: Keithley Instruments, Inc., Solon, Ohio

[22] Filed: June 26, 1970

[21] Appl. No.: 50,213

[52] U.S. Cl. ..............................328/127, 307/230, 307/235, 328/162

[51] Int. Cl. ..........................................G06g 7/18, H03k 5/00

[58] Field of Search ..................307/230, 235; 328/127, 128, 328/162, 163; 330/9

[56] References Cited

UNITED STATES PATENTS

| | | | |
|---|---|---|---|
| 3,541,320 | 11/1970 | Beall | 328/127 X |
| 3,200,338 | 8/1965 | Ellis | 328/127 X |
| 3,070,786 | 12/1962 | MacIntyre | 330/9 X |
| 3,516,002 | 6/1970 | Hillis | 330/9 X |

*Primary Examiner*—John Zazworsky
*Attorney*—Yount and Tarolli

[57] ABSTRACT

A drift compensated dual slope analog to digital converter is provided wherein an integrator is coupled to a signal level crossing detector. Circuitry is provided for compensating for offset drift voltages of both the integrator and signal level crossing detector.

13 Claims, 2 Drawing Figures

PATENTED APR 4 1972 3,654,560

SHEET 1 OF 2

Figure 1:
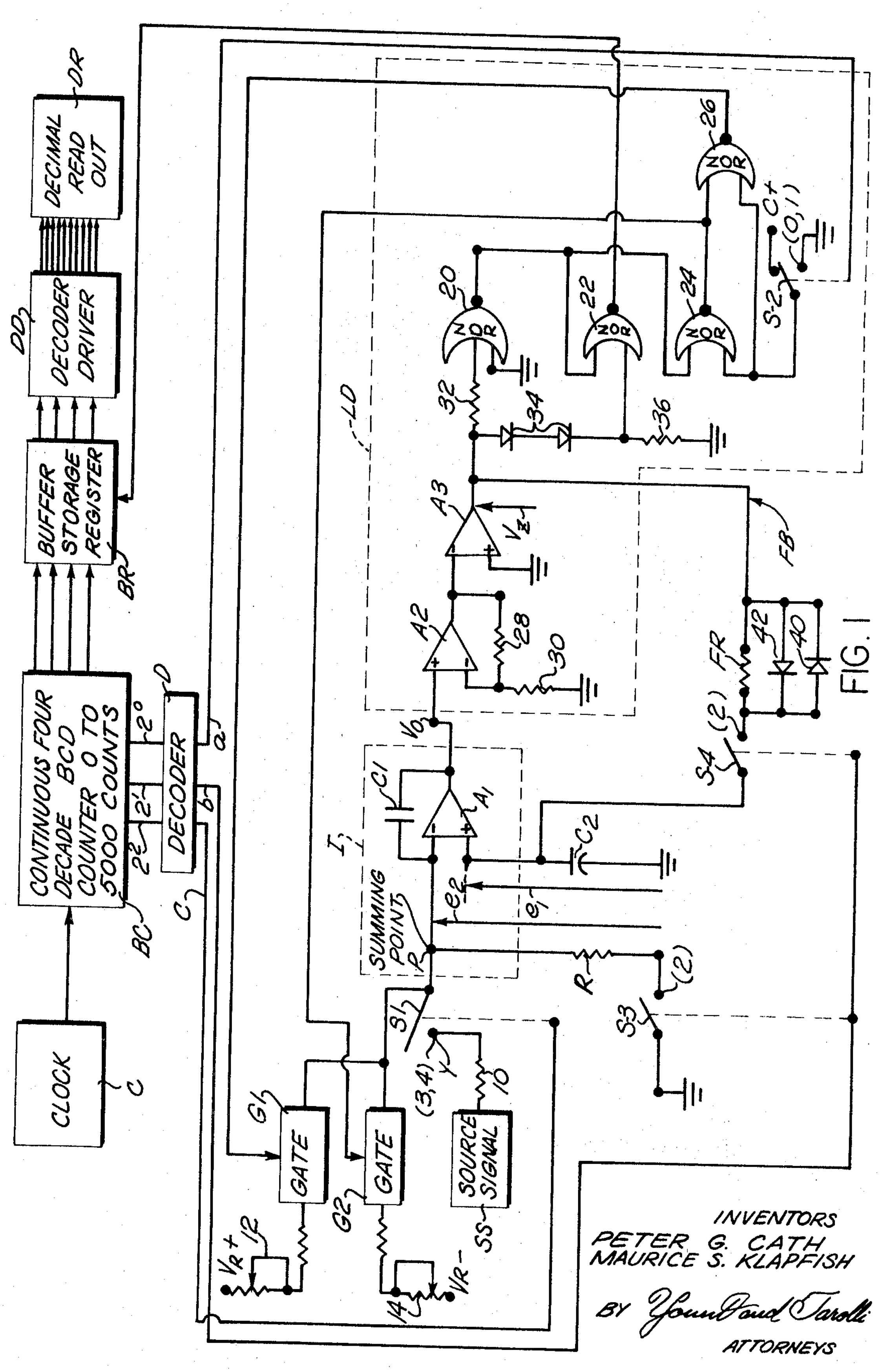

INVENTORS
PETER G. CATH
MAURICE S. KLAPFISH

BY Young and Tarolli
ATTORNEYS

INVENTORS
PETER G. CATH
MAURICE S. KLAPFISH
BY Yount and Tarolli
ATTORNEYS

DRIFT COMPENSATED CIRCUIT

This invention relates to the art of compensating for drifts in electrical signal sensing circuits.

The invention is particularly applicable in conjunction with dual slope analog to digital converters and will be described herein with particular reference thereto; although it should be appreciated that the invention has broader applications and may be used with various circuits, such as in providing drift compensation for signal level crossing detecting circuitry.

Basically, a dual slope analog to digital converter is a system wherein an unknown voltage is applied to an integrator capacitor for a fixed period of time, and then the capacitor is discharged at a known rate. The discharge time is proportional to the unknown voltage and, hence, if the discharge period of time is taken as a digital count a digital representation of the unknown voltage is obtained.

Generally, previous digital to analog converters have included an integrator circuit made up of an operational amplifier having an integrating capacitor coupled between the amplifiers's input and output circuits. An unknown voltage is integrated as the capacitor charges for a fixed period of time. Thereafter, a reference voltage of opposite polarity is applied so that the capacitor discharges at a known rate. A zero level crossing detector may be used to sense when the capacitor discharges to a zero level. A switch is then used to short circuit the capacitor so that it is completely discharged prior to commencing another cycle of operation.

In such converters it is normally assumed that the voltage stored by the capacitor during the charging period is the same as that discharged. However, zero level drifts of one or both of the integrator circuit and level detector circuit will result in inaccuracies of measurements taken. Thus, if there is any offset voltage at the input of the integrator, the capacitor will have an erroneous charging current of the same polarity during both the charging and discharging periods. Also, if an offset voltage is present on the input of the zero crossing detector circuit, the capacitor may commence charging from zero voltage level, but will appear to cross through a zero level when the capacitor is not fully discharged, due to the offset voltage of the zero crossing detector.

The present invention is directed toward overcoming the noted problems, and others, by compensating for such offset drift voltages.

In accordance with one aspect of the present invention, a closed loop differential input operational amplifier is provided together with switching means for applying input signals to one input circuit thereof so that during a cycle of operation the output potential of the amplifier varies from a first level to a second level and then returns toward the first level. Level crossing detecting means are also provided having an input circuit coupled to receive the output potential of the operational amplifier, and an output circuit for providing a direct current detector output signal which varies dependent on the level of the amplifier's output potential. Drift voltage compensating means serve to apply compensating signals to the operational amplifier for compensating for offset voltage drifts of the amplifier detector circuitry.

In accordance with a more limited aspect of the present invention, the compensating means includes a signal storage means, such as a capacitor, for applying the compensating signal to the amplifier throughout a cycle of operation.

Further, in accordance with the invention, the compensating means includes a feedback circuit operative between cycles of operation for applying the compensating signal to the amplifier in dependence upon offset drift voltages of the circuitry during a previous cycle of operation.

The primary object of the present invention is to obtain compensation of offset drift voltages for signal level detector circuitry.

Another object of the present invention is to provide a closed loop operational amplifier level crossing detector circuit having circuitry for compensating for offset drift voltages.

Another object of the present invention is to provide compensation for offset drift voltages of a circuit embodying an integrator and a level crossing detector.

A still further object of the present invention is to provide an improved dual slope integrator level crossing circuit which does not require a switch for completely discharg-ing the integrating capacitor after each cycle of operation.

A still further object of the present invention is to provide an improved dual slope integrator level detector circuitry wherein compensation is made for offset drift voltages of the circuitry.

A still further object of the present invention is to provide an improved integrator level detector circuit having dual mode means for quickly discharging the integrator capacitor when overloaded.

Figure 2:
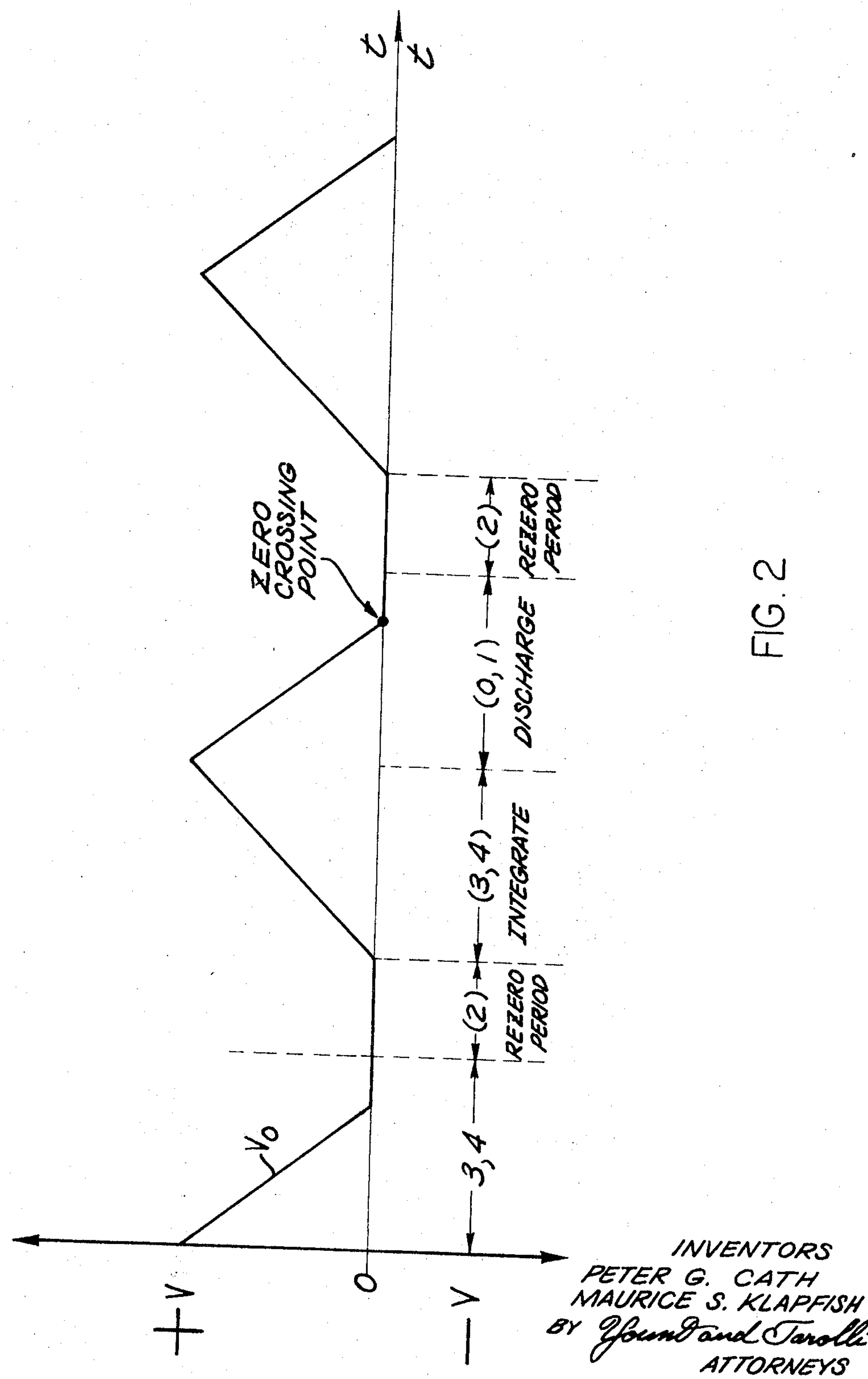

The foregoing and other objects and advantages of the present invention will be more readily appreciated from the following description of the preferred embodiment of the invention taken in conjunction with the accompanying drawings which are a part hereof and wherein:

FIG. 1 is a combined block-schematic diagram illus-trating the preferred embodiment of the invention; and, FIG. 2 is a wave form illustrating the operation of the invention.

GENERAL DESCRIPTION

Referring now to FIG. 1 wherein the showings are for purposes of illustrating a preferred embodiment of the invention only, and not for limiting same, there is illustrated an analog to digital dual slop converter. Briefly, the converter includes a clock C for providing a train of time spaced pulses, which are counted by a BCD counter BC and which, in turn, controls a decoder D to program the operation of circuitry including an integrator I and a level crossing detector LD. The level crossing detector is coupled so as to actuate a buffer storage register BR for receiving the prevailing count of counter BC. The count is then decoded by decoder driver DD and applied to a decimal readout DR. During the operation of the circuitry an unknown signal source SS is coupled to the input of integrator I for a fixed period of time and then a reference source $V_R+$ or $V_R-$ is coupled to the integrator's input for purposes of discharging the integrating capacitor. The level crossing detector LD serves the function of sensing when the discharging output voltage of integrator I passes through a particular level. This discharge time period is noted by actuating the buffer storage register to obtain the prevailing count of the BCD counter BC, so that a digital representation of the unknown signal SS may be displayed by the decimal readout DR. A feedback circuit FB and a resistor R serve, as will be described in greater detail hereinafter, to compensate for offset drift voltages of the integrator and level crossing detector. Having briefly described the operation of the circuitry shown in FIG. 1, reference is now made to the more detailed description of the circuitry and operation which follows below.

INTEGRATOR CIRCUIT

The integrator circuit I includes a high gain differential input operational amplifier A1 which may take various forms, such as Model No. LM301 offered by National Semiconductor Company. An integrating capacitor C1 is connected between the output of amplifier A1 and summing point P located on the inverting input circuit of the amplifier. Summing point P is connected to a switch S1 which, for purposes of simplifying the description of the invention, is shown as a simple electromechanical switch for connecting summing point P to signal source SS. The switch may take various forms; however, in a commercial embodiment of the invention, it would normally take the form of an electronic switch, such as a PNP or NPN or field effect transistor. Gates G1 and G2 connect fixed voltage sources $V_R+$ and $V_R-$, which are positive and negative voltage sources, respectively, to summing point P. The value of these two reference signals may be adjusted, as with variable resistors 12 and 14. Gates G1 and G2 may take various forms, such as electronic switches, including either PNP or NPN transistors, which upon receipt of trigger signals are conductive to apply the selected reference potential $V_R+$ or $V_R-$ to summing point P.

LEVEL CROSSING DETECTOR

The level crossing detector LD includes a high gain amplifier section made up of cascaded amplifiers A2 and A3, together with a level splitter section which includes NOR-gates 20, 22, 24 and 26. Amplifier A2 may take various forms, such as Model 709 provided by Fairchild Semiconductor Company, and amplifier A3 which serves as a comparator may take the form of Model 710 provided by Fairchild Semiconductor Company. Amplifier A2 serves as a differential input, closed loop non-inverting operational amplifier having its non-inverting input coupled to the output of amplifier A1 of the integrator circuit I. A resistor 28 is connected in the feedback circuit from the output circuit of amplifier A2 to the inverting input as well as through a resistor 30 to ground. The output circuit of amplifier A2 is connected to the inverting input of amplifier A3 having its non-inverting input connected to ground and its output circuit connected through a resistor 32 to one input of NOR-gate 20, as well as through a pair of series connected level tripping diodes 34, poled as shown, and a series connected resistor 36 to ground.

NOR-gates 20, 22, 24 and 26 may take various forms, such as either RTL (resistor-transistor logic) or DTL (diode-transistor logic). For purposes of explanation in context with the description of this invention, these gates will each be considered as a RTL NOR gate which normally provides at its output circuit a binary 0 signal when either or both of its inputs receive binary 1 signals. The output signal will be a binary 1 signal only when both of its input circuits receive binary 0 signals. NOR-gate 20 has its second input connected to ground and its output connected to one input of NOR-gate 22 as well as to one input of NOR-gate 24. The second input to NOR-gate 22 is taken from the junction of diode 34 and resistor 36. The output of NOR-gate 22 serves to gate the buffer storage register, as will be described in detail hereinafter, and, consequently, its output is coupled to the gating input of the buffer storage register BR. The output of NOR-gate 24 is connected to one input of NOR-gate 26. The output circuits of these two NOR-gates are normally maintained at binary 0 signal levels from a C+ voltage supply source, serving as a binary 1 signal, connected through switch S2 to the second input circuit of each of these NOR-gates. As will be explained in greater detail hereinafter, switch S2 is positioned to connect binary 0, or ground, potential to the second inputs of these two NOR gates for a fixed time during a cycle of operation under the control of decoder D. The output circuits of NOR-gates 24 and 26 are coupled to the gating inputs of gates G2 and G1, respectively, so that these gates will be conductive to apply their respective reference potentials $V_R-$ and $V_R+$ to summing point P only when the gating input signal is a binary 1 signal.

DIGITAL CIRCUITRY

The clock C serves to provide a continuous train of time spaced pulses. Clock C may take various forms and, for example, may run at 120 kHz. for 60 Hz. units, and 100 kHz. for 50 Hz. units. The pulses from the clock C are applied to the binary coded decimal counter BC, which counts these pulses and produces binary coded decimal output signals in accordance with the prevailing count. Preferably, counter BC is a four decade counter including a unit counter, a tens counter, a hun-dreds counter, and a thousands counter. Each of the first three counters counts 10 counts and the last counter is wired to count only five counts so that the entire counter BC has a capacity of counting 5,000 counts. The counter is continuous, that is, once count 4999 is reached, the next count is 0000. During a cycle of operation, as will be discussed hereinafter, the counter is set to commence its counting function with a count of 3,000 and counts to 4,999 and continues from a count of 0000 to a count of 2,999. In this manner, a full scale count will be considered as 2,000 counts, to wit, the count from 0,000 units through 1,999 units. The decoder D serves as a programmer for the integrator level crossing detector circuitry. Decoder D is coupled to the thousands decade of the counter BC which has only five states, designated by output circuits $2^2$, $2^1$, and $2^0$, which respectively provide a binary signal pattern having decimal weights of 4–2–1. Decoder D is coupled to these three outputs and has output circuits *a*, *b*, *c* which are respectively energized dependent on the decimal weight of the binary signals received. Circuit *a* is energized when the binary pattern of signals is 000 (representative of a zero decimal count) or 001 (representative of a 1,000 decimal count). Output circuit *b* is energized when the binary signal pattern to the input of decoder D is 010 (representative of a 2,000 decimal count). Output circuit *c* is energized when the binary signal pattern is either 011 (representative of a 3,000 decimal count) or a binary pattern of 100 (representative of a 4,000 decimal count). Consequently, it is seen that output circuit *a* is energized from decimal count 0000 through 1,999, output circuit *b* is energized from the decimal count 2,000 through 2,999, and output circuit *c* is energized from the decimal count 3,000 through 4,999. These three output circuits *a*, *b*, *c* demarcate three successive fixed periods which may be designated as the (0,1) period, the (2) period and the (3,4) period, respectively. Output circuit *a* when energized serves to actuate switch S2 from the position shown in the drawings, to the (0,1) position. For purposes of simplifying the explanation of the invention, switch S2 is shown as a simple electromechanical switch: however, it should be appreciated that the switch may take the form of NPN PNP or field effect transistors. Similarly, when output circuit *b* is energized it serves to actuate switches S3 and S4 from the position shown in the drawings to the (2) position. Also, output circuit *c* when energized serves to actuate switch S1 from the position shown in the drawings to connect summing point P to the (3,4) position.

The outputs of each of the four decade counters which make up counter BC are coupled to the buffer storage register BR, which receives these signals upon receipt of a gating signal. The buffer storage register BR may take various conventional forms and, for example, may include a set of flip-flops which are arranged to copy the binary states of the four decade counters, which make up binary counter BC, when a gating or buffer storage command signal is received. These outputs of the flip-flops, in turn, are decoded by decoder driver DD, which may include a conventional four line to 10 line binary coded decimal to decimal converter, for energizing tubes, or the like, which make up the decimal readout DR.

COMPENSATING CIRCUITRY

The compensating circuitry includes a feedback path FB coupled from the output circuit of amplifier A3 to the non-inverting input circuit of amplifier A1, in the integrator circuit I, and a resistor R coupled to summing point P. More specifically, feedback path FB includes switch S4 which, as discussed hereinbefore, may take the form of a field effect transistor, or the like, in series with a feedback resistor FR which may, for example, have a value on the order of 100 kilohms. A pair of oppositely poled diodes 40 and 42 are connected together in parallel across feedback resistor RF. These diodes, as will be explained in greater detail hereinafter, serve to provide a low impedance path to current flow from the output of amplifier A3 to the junction of the non-inverting input circuit of amplifier A1 and a storage capacitor C2 when the voltages applied thereto are above a predetermined level, such as above 0.5 volts. The compensating circuitry also includes switch S3 for connecting summing point P through resistor R to a reference potential, which may, as shown in the drawings, be ground.

OPERATION

During the operation of the converter circuitry the decoder D demarcates three fixed time periods as output circuits *a*, *b*, *c* are respectively energized. Since the counter will be set to commence a cycle of operation with a count of 3,000, the first time period commences with energization of output circuit *c* which demarcates the (3,4) time period. During this period switch S1 is closed so that signal source SS is applied to the summing point P of the integrating circuit I to thereby charge capacitor C1. After the counter has counted 2,000 counts, so that its count reading is 0000, switch S1 is opened and switch S2 is closed. During the charging period the output potential $V_O$ of integrator I is applied to the non-inverting input of operational amplifier A2. The polarity of output potential $V_O$ is decoded to actuate gate G1 or gate G2. If the output potential $V_O$ is of positive polarity (due to a negative polarity of signal source SS) a binary 0 signal is applied to NOR-gate 20 so that the output of this gate is a binary 1 signal. Conversely, the output of NOR-gate 20 is a binary 0 signal when output potential $V_O$ is of negative polarity.

As stated hereinbefore, once counter BC has reached a decimal count of 0000, then decoder output circuit *a* is energized to position switch S2 to its (0,1) position. This, in turn, applies a binary 0 enabling signal to one input each of NOR-gates 24 and 26. If the output of NOR-gate 20 is a binary 1 signal, the output of NOR-gate 24 will be binary 0 signal and the output of NOR gate 26 will be a binary 1 signal. Since a binary 1 signal will actuate gate G1 or G2, only gate G1 will be actuated so that during the (0,1) period of time, the fixed, positive polarity, potential source $V_R+$ will be applied to summing point P of integrator circuit I. Since this is a known potential, capacitor C1 will discharge at a known rate toward the initial level of output potential $V_O$. In this description of operation, it is assumed that the initial potential at summing point P is at ground or zero potential and that the initial potential $V_O$ at the output of amplifier A1 is also at ground or zero potential. Consequently, an opposite polarity potential $V_R+$ is now applied to the summing point P so that the capacitor C1 discharges toward ground potential. As this negative going potential, as shown by the negative going slope of output potential $V_O$, in FIG. 2, crosses the zero voltage level, the output potential of amplifier A3 will switch to apply a binary 1 signal to the input of NOR-gate 20. The level splitter section of level detector LD will at this point in time sense the zero crossing and apply a trigger or buffer command signal to the buffer storage register BR so that it will receive the prevailing count of the counter BC. This binary coded decimal pattern of signals is then decoded by decoder driver DD to drive decimal readout DR which, as stated hereinbefore, takes the form of a nixie tube for each decade so as to provide a decimal readout representative of the magnitude of the unknown signal source SS.

In the description of the operation given thus far, an assumption has been made that at the commencement of a cycle of operation the potential existing at summing point P is ground or zero potential, that capacitor C1 is fully discharged so that output potential $V_O$ is at zero potential, and that the buffer storage register BR is actuated when the output potential $V_O$ returned to its zero or ground potential. The difficulty in this assumption results from zero drifts of both or either of the integrator and the level crossing detector. If there is an offset voltage on the integrator input, capacitor C1 will have an erroneous charge current of the same polarity during both the integration and discharge periods. Also, if there is an offset voltage at the input of the level crossing detector LD then capacitor C1 may have started a measuring cycle from a zero potential but would have finished, that is, an output trigger signal to the buffer register BR would have been provided, at some voltage other than zero, as dictated by the offset voltage of the level crossing detector. In accordance with the present invention these offset drift voltages are compensated for by means of feedback circuit FB, compensating signal storage capacitor C2 and rezeroing resistor R.

During the rezeroing period (2), feedback circuit FB places a closed loop around the integrator I and level crossing detector LD. Referring now to FIG. 1, $e_1$ is the potential during the rezeroing period between the non-inverting input of amplifier A1 and ground, $e_2$ is the potential between ground and summing point P and $V_z$ is the output potential of amplifier A3 with respect to ground.

If $e_1$, the correction or compensating signal voltage, is initially zero, then integrator circuit I operates such that its output potential is:

$$V_0 = +\frac{1}{RC_1}\int_0^{T_z} e_2 dt \qquad (1)$$

where:

$T_z$ is the zeroing time of period (2), $R$ is the resistance of rezeroing resistor R, and $C_1$ is the capacitance of integrating capacitor C1.

The level crossing detector LD is a high gain amplifier that can be closely approximated by:

$$V_z = -A_z V_O \qquad (2)$$

wherein $A_z$ is the gain of level crossing detector LD. An finally, $$e_1 = \frac{1}{1+jwFRC_2} V_z \qquad (3)$$

Consequently, a corrective voltage is applied to $e_1$ to return output potential $V_O$ to zero. The assumption has been made that potential $V_O$ commences and ends a cycle of operation at zero potential and, hence it is necessary during the rezeroing period that $e_2$ equals zero so that no further integration occurs through resistor R. If $(e_2-e_1)$ changes, then $e_1$ is automatically adjusted so that $e_2$ equals zero. Consequently, $e_1$ is by this procedure automatically adjusted to first discharge integrator capacitor C1 and then return $e_2$ to zero.

If, however, the offset voltage of the level crossing detector LD is not zero, then after sufficient settling time $V_O$ will be equal to the offset voltage of detector LD. This is of no concern since the operation of the circuitry requires only that the integrator start and end a cycle of operation at the same point, in this case the offset voltage of the level crossing detector.

From the foregoing, it is noted that $e_1$ is adjusted such that there is no current being integrated by capacitor C1, i.e. there is no current flow through resistor R. If switch S3 connects resistor R to ground then potential $e_2$ is also brought to ground potential. However, if switch S3 connects the bottom of resistor R to some potential $V_1$, then point $e_2$ is also brought to this potential $V_1$. Thus, the rezero level crossing detector circuit allows one to measure the difference between the unknown source SS and some other potential $V_1$. This makes the input of the converter truly differential and thus gives immunity from small voltage differences which may exist through ground loops, thus giving better accuracy.

If the unknown signal from source SS is too high, then capacitor C1 may not fully discharge to its initial level during the discharge period (0,1). This is an overload condition, and it is desirable during the rezeroing period (2) to complete the discharge. Some filtering in the rezero loop is desirable to minimize low frequency noise; however, such filtering may prevent the system from rapidly discharging a large charge on capacitor C1 due to an overload condition. Consequently, to attain these objectives it is desirable to provide dual mode rezeroing circuitry, wherein a short time constant is initially used, followed by a large time constant as the integrator is nearly at its zeroed condition so as to thereby filter low frequency noise of the amplifier. For these purposes, resistor FR and capacitor C2 comprise the filter and diodes 42 and 40 switch the rezero mode. Thus, when the level crossing detector output voltage $V_z$ is greater than ±0.5 volts, one of these diodes conducts to provide high speed rezeroing. As $V_z$ decreases, these diodes turn off and the slow rezeroing mode operates to filter the amplifier noise and maintain near perfect zeroing conditions.

The invention has been described with reference to a specific preferred embodiment, but is not limited to same as various modifications may be made without departing from the spirit and scope of the invention as defined by the appended claims.

What is claimed is:

1. A drift compensated circuit comprising:

a closed loop, differential input, operational amplifier having a pair of input circuits and an impedance coupled between the output circuit of said amplifier and one input circuit thereof;

first switching means for applying input signals to said one input circuit so that during a cycle of operation the output potential on said output circuit varies from a first level to a second level and then returns toward its said first level;

level crossing detector means having an input circuit coupled to receive said output potential and an output circuit for providing a detector output signal which varies from a given level dependent on the level of said output potential; and, drift voltage compensating means for compensating for drift voltages of said amplifier and said detector means connected to the other input circuit of said operational amplifier for applying thereto a compensating signal to compensate for offset drift voltages of said amplifier and said detector means.

2. A circuit as set forth in claim 1, wherein said compensating means includes a compensating signal storage means for applying a said compensating signal to said other input circuit throughout a said cycle of operation.

3. A circuit as set forth in claim 1, wherein said compensating means includes circuit means for applying a said compensating signal to said other input circuit dependent upon any variation of said detector output signal, after a said cycle of operation, from its said given level to thereby vary the said output potential so that prior to the next said cycle of operation the said first level of said output potential is sufficient that said detector signal is at said given level.

4. A circuit as set forth in claim 1, including feedback circuit means operative between said cycles of operation to be coupled between said level crossing detector output circuit and said other input circuit of said amplifier to vary said compensating signal in dependence upon any said offset drift voltages during the previous cycle of operation.

5. A circuit as set forth in claim 4, including second switching means operative between said cycles of operation to connect said one input circuit of said amplifier to a reference potential so that any offset voltage drift of said amplifier relative to said reference potential will cause current to flow through said impedance to vary said compensating signal so that the initial potential level of said one input circuit will be at said reference potential at the commencement of the next said cycle of operation.

6. A circuit as set forth in claim 5, wherein said level crossing detector means includes an open loop operational amplifier so that the said detector output signal is a direct current signal which varies dependent on the level of said output potential.

7. A circuit as set forth in claim 6, wherein said level detector means includes a second closed loop operational amplifier interposed between said first closed loop operational amplifier and said open loop operational amplifier.

8. A circuit as set forth in claim 1, wherein said impedance includes an integrating capacitor and said first switching means applies a first direct current input signal to said one input circuit for a first fixed period of time to charge said capacitor from said first level to a second level and during at least a portion of succeeding second fixed period of time applying a direct current reference signal of opposite polarity to said one input circuit to discharge said capacitor toward said first level.

9. A circuit as set forth in claim 8, including second switching means for during a third fixed period of time, immediately following said second period of time and prior to the next said first period of time, connecting a feedback circuit between said level crossing detector output circuit and said other input circuit for applying a said compensating signal to said other input circuit to compensate for offset voltage drifts of said circuit.

10. A circuit as set forth in claim 9, including third switching means for during said third period of time connecting said one input circuit of said operational amplifier to a reference potential so that offset voltage drifts of said amplifier relative to said reference potential will cause current to flow through said integrating capacitor, resulting in a corresponding change in said compensating signal applied to said other input circuit so that at the commencement of the next said first period of time the potential at said one input circuit will be at the level of said reference potential.

11. A circuit as set forth in claim 10, including a storage capacitor coupled to said other input circuit for storing any said correction signal applied thereto during said third period so that said correction signal will be applied to said other input circuit by said storage capacitor during the next succeeding first and second periods.

12. A circuit as set forth in claim 11, wherein said feedback circuit includes a series resistor connected in parallel with a pair of oppositely poled parallelly connected diodes for rapidly discharging said integrating capacitor.

13. A circuit as set forth in claim 10, in combination with timing means for timing said fixed periods of time.

* * * * *